Figure 1:
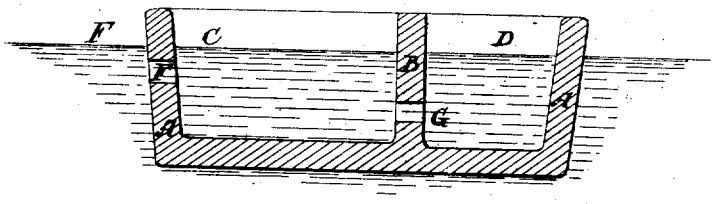

3 Sheets—Sheet 1

F. SIEMENS,

Assignor to C. W. SIEMENS.

Manufacture of Glass.

No. 9,418. Reissued Oct. 19, 1880.

Witnesses:
David R. Zimmer
R. B. Whitman

Inventor:
Friedrich Siemens
by
C. S. Whitman Atty.

3 Sheets—Sheet 2.

F. SIEMENS,

Assignor to C. W. SIEMENS.

Manufacture of Glass.

No. 9,418. Reissued Oct. 19, 1880.

Witnesses:
Lewis R. Turner
B. H. Wilner

Inventor:
Friedrich Siemens
by
C. S. Whitman Atty.

F. SIEMENS,

Assignor to C. W. SIEMENS.

Manufacture of Glass.

No. 9,418. Reissued Oct. 19, 1880.

Witnesses:
Saml R Turner
R. B. Whitman

Inventor
Frederick Siemens by
C. S. Whitman Att'y

UNITED STATES PATENT OFFICE.

FREDERICK SIEMENS, OF DRESDEN, GERMANY, ASSIGNOR TO CHARLES WILLIAM SIEMENS, OF WESTMINSTER, ENGLAND.

MANUFACTURE OF GLASS.

SPECIFICATION forming part of Reissued Letters Patent No. 9,418, dated October 19, 1880.

Original No. 189,800, dated April 17, 1877. Application for reissue filed June 14, 1880.

*To all whom it may concern:*

Be it known that I, FREDERICK SIEMENS, of Dresden, in the German Empire, have invented an Improvement in the Manufacture of Glass and Apparatus therefor, of which the following is a specification.

My invention relates to the art of continuously fining and working out glass; and the nature thereof consists in freeing the melted material from the impurities floating on the liquid in the tank or pot by means of a floating vessel or boat which swims in the liquid glass and is provided with holes through which the melted material flows therein from a point below the surface of the metal in the tank or pot. According to this part of my invention I construct a fire-clay vessel or boat, by preference of oblong shape, which swims in the liquid glass, and I form therein holes in such a position that, as the boat floats, they are situated under the surface of the liquid glass in the tank or pot, so that the melted material flows into the boat through these holes entirely free from the impurities floating on the surface of the liquid in the tank or pot.

My invention also consists in a process of continuously fining and working out glass in a tank, furnace, or pot by causing the metal to flow from a point below the surface thereof into one compartment of a floating vessel or boat, from which it is made to flow into another compartment, where it is worked out. In carrying into operation this part of my invention I construct a fire-clay vessel or boat, by preference of oblong shape, which swims in the liquid glass in the tank, furnace, or pot.

The boat is divided by a cross-partition into two compartments, in the end of one of which are formed holes in such a position that, as the boat floats, they are situated under the surface of the liquid glass in the tank or pot, so that the melted material flows into the boat through these holes entirely free from the impurities floating on the surface of the liquid in the tank or pot. As the glass flows into this compartment it becomes more fluid by the action of the heat at the surface than below, and consequently in becoming denser it sinks to the bottom of the compartment, whence it flows through openings near the bottom of the partition into a second compartment, which is situated opposite the working-out hole of the furnace, and from which the glass is worked out by the operator. If it is desirable to shield the glass in this second compartment somewhat from the heat of the furnace, the partition may be raised some height above the top of the boat, or the compartment may be covered by a hood provided with an opening for working out the glass.

If it is desired to carry the fining of the glass still further, this may be effected by constructing the boat with three or more separate compartments instead of only two, through which the glass is made to flow consecutively before it is worked out.

Instead of making the boat with a fixed partition, as described, it may contain a movable ring of fire-clay which floats in the glass in the boat, the space within such ring serving as the second compartment from which the glass is worked out.

My invention also consists in an apparatus for continuously fining or working out glass from a tank, furnace, or ordinary glass pot, consisting of a boat or vessel having holes formed in the sides thereof, and communicating compartments, and capable of floating in the liquid glass of a tank, furnace, or ordinary glass-pot.

Figure 2:
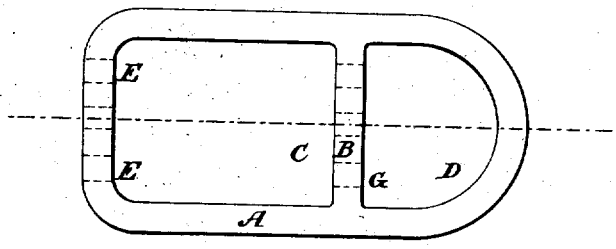
Figure 3:
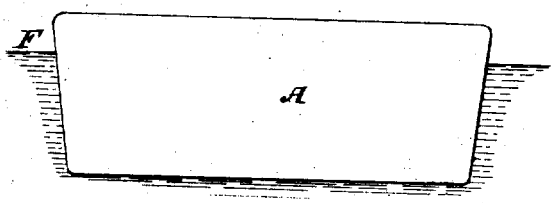
Figure 4:
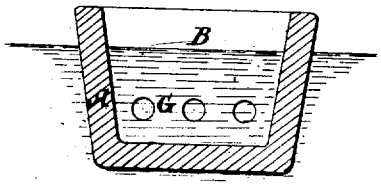
Figure 5:
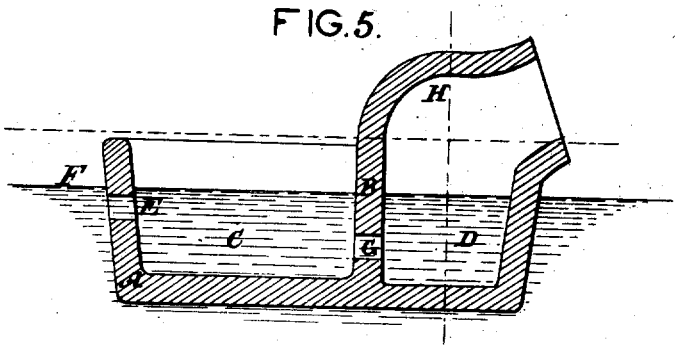
Figure 6:
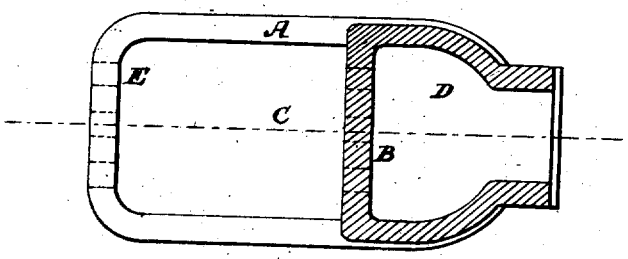
Figure 7:
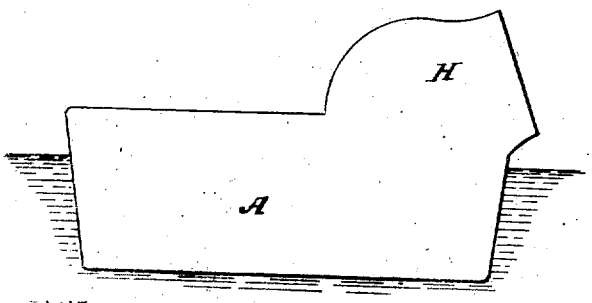
Figure 8:
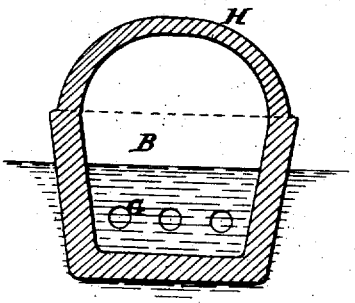
Figure 9:
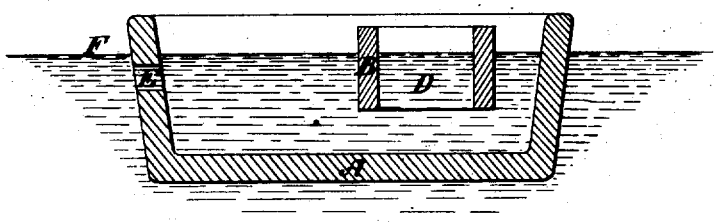

In the accompanying plates of drawings, in which corresponding parts are designated by the same letters, Figure 1 shows a longitudinal section, Fig. 2 a plan, Fig. 3 a side elevation, and Fig. 4 a cross-section, of a floating vessel, by means of which the objects of my invention may be attained. Fig. 5 shows a longitudinal section, Fig. 6 a sectional plan, Fig. 7 a side view, and Fig. 8 a cross-section, of a floating vessel in which the working-out compartment is provided with a hood in order to protect the liquid glass therein and the operator from the heat of the furnace. Fig. 9 is a longitudinal view, and Fig. 10 a plan, of a modification of the floating vessel, in which, in lieu of a fixed partition, there is provided a loose fire-clay ring which floats in the glass in the boat.

Figure 10:
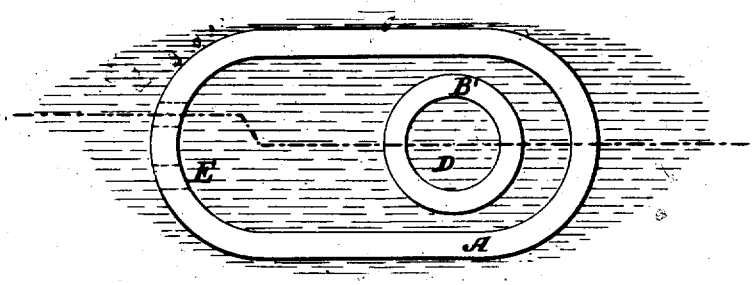

The fire-clay vessel or boat A is divided by a partition, B, into two compartments, C and D. Near the top of the compartment C are holes E E, through which the liquid glass can flow into the compartment, the boat being so formed that when floating these holes are situated under the surface F of the glass in the tank or glass-pot. Near the bottom of the partition B are other holes, G, through which the glass, as it sinks in the compartment C, flows into the compartment D, in order there to be worked out by the operator. In lieu of the partition B, the floating vessel may be provided with a loose fire-clay ring, B′, which floats in the glass therein, as shown in Figs. 9 and 10. In this case the melted material flows into the boat through the holes E E, as before, entirely free from the impurities floating on the surface of the liquid. As the glass flows into the boat it becomes more fined by the action of the heat at the surface than below, and consequently becoming denser, it sinks to the bottom of the boat, whence it flows under the ring B′ into the interior space, D, which constitutes the compartment from which the glass is worked out.

From the foregoing description it will be obvious that the process of freeing the melted material from the impurities floating on the surface of the liquid in the tank or pot may be carried into operation without the use of the ring B′.

Having thus described my invention, I claim and desire to secure by Letters Patent of the United States—

1. In the melting and fining of glass in a tank, furnace, or pot, the process of freeing the melted material from the impurities floating on the surface of the liquid by means of a floating vessel or boat into which the melted material flows from a point below the surface of the metal in the tank or pot.

2. The process of continuously melting, fining, and working out glass, which consists of drawing the melted material from a point below the surface of the metal in the tank or pot into one compartment of a floating vessel and then causing it to flow into another compartment from which it is worked out.

3. A floating vessel having holes in its side for the passage of the melted material, and two or more communicating compartments, as and for the purposes described.

4. A floating vessel having holes in its side for the passage of the melted material, as and for the purposes described.

5. A floating vessel for fining and working out glass having a fining-compartment exposed to the action of the heat of the furnace, and a working-out compartment protected from the heat by a hood, as and for the purposes described.

6. In combination with a floating vessel, a fire-clay ring which floats in the glass in the vessel, as and for the purposes described.

FREDERICK SIEMENS.

Witnesses:
C. ROCHE,
THOS. MARCH,
*Both of No. 2 Waterloo Place, Pall Mall, London, Notary's Clerks.*